March 16, 1954 H. J. McSKIMIN 2,672,590

DELAY LINE

Filed March 22, 1950

INVENTOR
H. J. McSKIMIN
BY
Ralph T. Holcomb
ATTORNEY

Patented Mar. 16, 1954

2,672,590

UNITED STATES PATENT OFFICE 2,672,590

DELAY LINE

Herbert J. McSkimin, Basking Ridge, N. J., assignor to Bell Telephone Laboratories, Incorporated, New York, N. Y., a corporation of New York Application March 22, 1950, Serial No. 151,175

17 Claims. (Cl. 333—30)

This invention relates to wave transmission and more particularly to an electromechanical delay line utilizing a solid acoustic transmitting medium.

An object of the invention is to improve the performance of a delay line by widening and flattening the transmission band and by reducing distortion, spurious reflections and echoes.

Another object is to provide precise adjustment of the delay.

Other objects are to reduce the size and cost of such a delay line.

The electromechanical delay line in accordance with one embodiment of the present invention comprises two piezoelectric crystal transducers associated with a solid acoustic transmitting medium such as fused silica or glass. The electrical signals to be delayed are impressed upon the input crystal, which converts them into mechanical vibrations in the nature of acoustic waves. These mechanical vibrations are, in turn, imparted to the solid transmitting medium, wherein the required delay occurs, and then picked up by the receiving crystal, which reconverts them into electrical impulses.

In order to reduce the size of the delay line, the crystals are so positioned on the solid medium, and the solid medium is so shaped, that the main transmission path therethrough traverses the solid medium two or more times. In the embodiment shown the solid medium is a substantially rectangular block, the crystals are placed near the edges at one end thereof, and the corners at the opposite end of the block are beveled to provide two reflecting surfaces. A third reflecting surface occurs at the one end, between the crystals, and is preferably provided with an energy-absorbing cell to attenuate the echoes and spurious reflections and thereby reduce the distortion. In order to provide precise adjustment of the delay, at least one of the reflecting surfaces is left exposed so that it may easily be ground off, if required.

In order to widen and flatten the transmission band of the delay line, and make the characteristic substantially symmetrical, a quarter-wave mechanical transformer in the form of a solder bond is provided between each crystal and the solid medium. At certain frequencies a single layer of solder, applied under a predetermined pressure, may be less than a quarter-wave thick. The required thickness is, however, built up by interposing one or more layers of metallic foil between layers of solder. The transmission band is further flattened by shunting across each crystal an inductance and a resistance of proper value.

Figure 1:
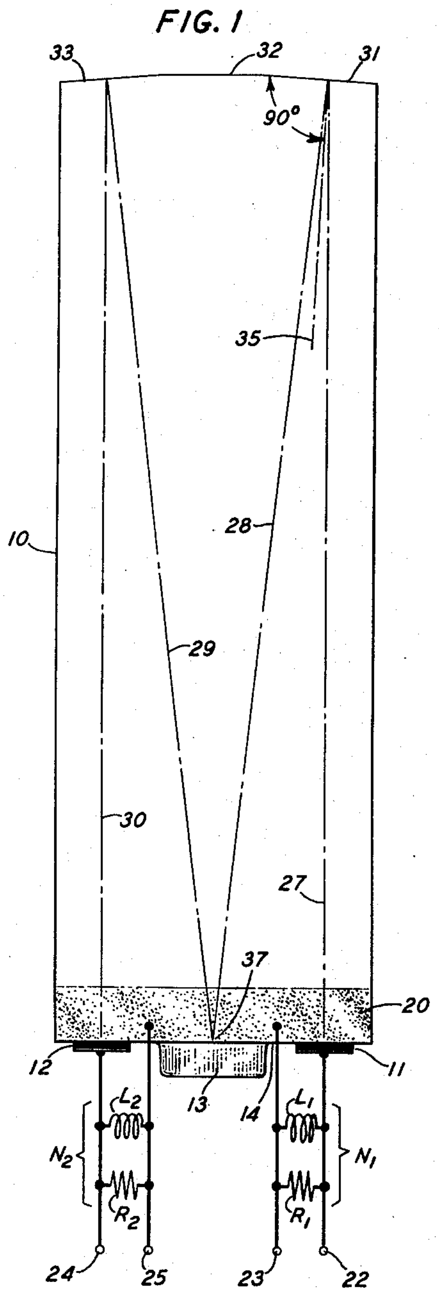
Figure 2:
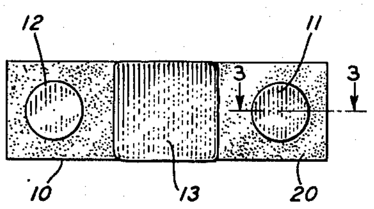
Figure 3:
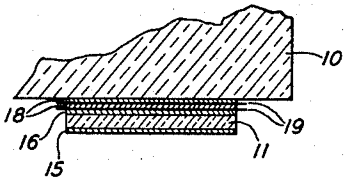

The nature of the invention will be more fully understood from the following detailed description and by reference to the accompanying drawings, of which:

Fig. 1 is a plan view, partly schematic, and Fig. 2 is an end view, of one embodiment of an electromechanical delay line in accordance with the invention; and Fig. 3 is an enlarged fragmentary longitudinal section, taken at the line 3—3 in Fig. 2, showing how the solder bond between the crystal and the solid transmitting medium is built up to the required quarter-wave thickness by interposing layers of metal foil.

Taking up the figures in more detail, the delay line comprises a solid acoustic transmitting medium 10, an input piezoelectric crystal 11, a receiving piezoelectric crystal 12, and an energy-absorbing cell 13. The solid medium 10 is in the form of a substantially rectangular, elongated block which may, for example, be made of fused silica or glass of suitable composition. The crystals 11 and 12 are secured to the end 14 of the block 10 near the respective edges. Each of the crystals has associated therewith an outer electrode 15 and an inner electrode 16 which may be applied in any suitable manner. The crystals may, for example, be made of quartz and are resonant at or near the mid-band frequency. They are cut so as to set up in the block 10 either transverse (shear) or longitudinal (compressional) mechanical vibrations in the nature of acoustic waves. The transverse mode is preferred for low-frequency operation and the longitudinal mode for high.

As shown more clearly in Fig. 3, each crystal is secured to the block 10 by means of a composite quarter-wave bond made up of alternate layers of solder 18 and thin metallic foil 19. For example, each layer of solder 18 may be of the order of 0.001 inch in thickness and each foil 19 of the order of 0.0001 inch thick. Sufficient layers are provided to build up the thickness of the composite bond to approximately a quarter wavelength at the resonant frequency of the crystal when the bond is formed under a suitable predetermined pressure. The presence of the foils 19 thus permits the building up of a quarter-wave bond when a single layer of solder would not have sufficient thickness. As indicated by the stippling in Figs. 1 and 2, a thin metallized film 20 made, for example, of silver paste is applied to the end 14 and the adjacent portions of the sides of the block 10 in order to provide a good surface for the adherence of the inner layer of solder 18, the absorber 13 and the terminal connections. It is desirable to keep the foil 19 and the film 20 sufficiently thin that a possible mismatch in acoustical impedance will not unduly interfere with the proper operation of the delay line.

The delay line has a pair of input terminals 22, 23 and a pair of output terminals 24, 25. Input terminal 22 is connected to the outer electrode 15 of the input crystal 11; output terminal 24 is connected to the outer electrode of the receiver crystal 12. The other terminals 23 and 25 are electrically connected to the metallized film 20 as indicated by the dots.

In operation the electrical signal to be delayed is applied to the input terminals 22, 23 and converted by the input crystal 11 into mechanical vibrations in the nature of acoustic waves. These waves suffer the desired delay as they traverse the block 10 four times, after which they are reconverted by the receiving crystal 12 into electrical impulses appearing at the output terminals 24, 25. In the block 10 the center of the energy beam follows the path 27 from the input crystal 11 to the reflecting surface 31 at the other end 32, the path 28 back to the end 14 for a second reflection, the path 29 to the reflecting surface 33 at the end 32, and the path 30 to the receiving crystal 12. The reflecting surfaces 31 and 33 are provided by properly beveling the corners at the end 32 of the block 10. The surface 31 is perpendicular to the line 35 which bisects the angle between the paths 27 and 28. Similarly, the surface 33 is perpendicular to the bisector of the angle formed by the paths 29 and 30. The reflecting surfaces 31 and 33 are left exposed so that precise adjustment of the delay time may be made by grinding down one or both, if required.

The energy-absorbing cell 13 is secured to the block 10 between the crystals 11 and 12 and preferably is large enough to cover a considerable portion of the area of the end 14. The absorber is made of homogeneous material applied directly to the metallized surface of the end 14 so that it will provide substantially the same attenuation for the reflected wave over a wide frequency band. A suitable material is a eutectic solder.

In all practical cases, when the acoustical impedance of the transmitting medium 10 differs from that of the absorber 13 part of the incident acoustic wave energy which impinges upon the portion of the surface 14 covered by the absorber is reflected and the rest enters the absorber, where it is dissipated. The absorber thus attenuates all of the energy reaching it by a fixed amount determined by the relative acoustical impedance of the absorber and the solid medium. The main beam is subjected to this attenuation by the absorber only once, since it is reflected by the end 14 only once, in the vicinity of the point 37. However, spurious reflections and echoes will, in general, strike the absorber two or more times and will, therefore, be attenuated by it more than once. For example, the first echo suffers attenuation by the absorber three times, since it traverses the path 27—28—29—30 three times and on each trip encounters the absorber. Thus, the undesired reflections and echoes are differentially attenuated with respect to the main beam and, consequently, the distortion of the signal as it passes through the delay line is reduced. The reduction in distortion attainable by this method is, in general, limited only by the maximum insertion loss permissible for the desired signal. The insertion loss is made up of the attenuation introduced by the absorber and the attenuation contributed by the other elements comprising the delay line. When the permissible attenuation by the absorber has been ascertained, the relative impedances of the absorber and the transmitting medium may be found by standard formulas. Since the impedance of the transmitting medium 10 is known, the required impedance of the absorber 13 is thus determined. It is evident that the impedance of the absorber may be either greater or less than that of the transmitting medium.

In order to flatten the transmission band further, impedance-correcting networks may be added to the delay line at either the input end or the output end, or at both. Fig. 1 shows schematically simple networks that may be used for this purpose. The input network $N_1$ comprises the parallel combination of an inductance $L_1$ and a resistance $R_1$ connected across the input terminals 22, 23. The output network $N_2$ comprises a similar combination of an inductance $L_2$ and a resistance $R_2$ connected across the output terminals 24, 25. The value of the inductance $L_1$ is so chosen that, at the resonant frequency of the crystal 11, its reactance is substantially equal in magnitude to the reactance of the interelectrode capacitance of the crystal and any associated stray capacitance, thus providing a non-reactance impedance as viewed from the terminals 22, 23. The inductance $L_2$ is proportioned in a similar manner with respect to the capacitance of the crystal 12, and any associated stray capacitance, so that the impedance seen at the terminals 24, 25 is substantially non-reactive. The values of the resistances $R_1$ and $R_2$ are adjusted to give the desired band width. As these resistances are decreased in value, the width of the band is increased, but the loss in the band is also increased.

The delay obtained in the delay line is, of course, determined principally by the total length of the path 27—28—29—30 traversed by the main beam. In a device of the type disclosed a delay of 125 microseconds has been obtained, with a very flat band 25 megacycles wide centered at approximately 27 megacycles per second. The block 10 was made of fused silica with approximate dimensions of 0.75 by 2.375 by 7.5 inches. The crystals 11 and 12 were X-cut quartz, resonant at approximately 27 megacycles. The longitudinal mode of propagation was employed. Each crystal had a diameter of 12.7 millimeters and a thickness of 0.114 millimeter. The layers of solder 18 and 19 were made of a eutectic mixture of lead, tin and bismuth. The coating 20 was formed of silver paste, nickel flashed. The inner faces of the crystals were given a similar treatment, in order to provide a good surface for soldering. With an applied pressure of approximately 25 pounds per square inch it was found that a quarter-wave bond could be consistently obtained with two layers of solder 18 and two layers of nickel foil 19 each 0.00015-inch thick. The absorber 13 was also made of eutectic solder composed of lead, tin and bismuth having an acoustical impedance of approximately 1.65 times that of the block 10, and thus provided an attenuation of approximately 12 decibels. All spurious pulses and echoes were suppressed by approximately 30 decibels, of which about 6 decibels resulted from the acoustic losses in the transmitting medium 10 The resistance $R_2$ had a value of approximately 300 ohms and the resistance $R_1$ was of the same order of magnitude.

What is claimed is:

1. A delay line comprising a solid transmitting medium in the form of a substantially rectangular block having beveled corners at one end, a transducer for applying mechanical vibrations to said block, a second transducer for receiving said vibrations, said transducers being located at the opposite end of said block near the respective edges thereof, and an energy absorber secured directly to said opposite end between said transducers, said absorber being made of solid homogeneous material having an acoustical impedance differing from, but of the same order of magnitude as, that of said medium.

2. A delay line comprising a solid transmitting medium, a transducer for applying mechanical vibrations to said medium at one point, a second transducer at another point in said medium for receiving said vibrations, a main transmission path for said vibrations through said medium between said points which includes a reflecting surface, and an energy absorber secured directly to said surface, said absorber being made of solid homogeneous material having an acoustical impedance differing from, but of the same order of magnitude as, that of said medium, one of said transducers comprising a piezoelectric crystal and a bond for securing said crystal to said medium comprising a plurality of layers of solder and at least one interposed layer of metal foil, and said bond having a thickness approximately equal to a quarter wavelength at the resonant frequency of said crystal.

3. A delay line in accordance with claim 2 which includes a resistance and an inductance both connected in shunt with said crystal for flattening the transmission band.

4. A delay line in accordance with claim 3 in which said transmission path includes a second reflecting surface, said second surface being exposed so that it may be ground off for precise delay adjustment.

5. A delay line comprising a solid transmitting medium, a transducer for applying mechanical vibrations to said medium at one point, a second transducer at another point in said medium for receiving said vibrations, a main transmission path for said vibrations through said medium between said points which includes a reflecting surface, and an energy absorber secured directly to said surface, said absorber being made of solid homogeneous material having an acoustical impedance differing from, but of the same order of magnitude as, that of said medium, one of said transducers comprising a piezoelectric crystal, and a resistance and an inductance both connected in shunt therewith for flattening the transmission band, and said transmission path including a second reflecting surface, said second surface being exposed so that it may be ground off for precise delay adjustment.

6. A delay line comprising a solid transmitting medium, a transducer for applying mechanical vibrations to said medium at one point, a second transducer at another point in said medium for receiving said vibrations, a main transmission path for said vibrations through said medium between said points which includes a reflecting surface, and an energy absorber secured directly to said surface, said absorber being made of solid homogeneous material having an acoustical impedance differing from, but of the same order of magnitude as, that of said medium, said transmission path including a second reflecting surface, and said second surface being exposed so that it may be ground off for precise delay adjustment.

7. In combination, a solid transmitting medium, a piezoelectric crystal, and a bond for securing said crystal to said medium comprising a plurality of layers of solder and at least one interposed layer of metal foil, said bond having a thickness approximately equal to a quarter wavelength at the resonant frequency of said crystal.

8. The combination in accordance with claim 7 and a resistance and an inductance both connected in shunt with said crystal, said inductance having a reactance approximately equal in magnitude to the reactance of the interelectrode capacitance associated with said crystal at the resonant frequency of said crystal.

9. In combination, a delay line comprising a solid transmitting medium in the form of a substantially rectangular block having beveled corners at one end, means for applying mechanical vibrations to the other end of said block, means at said other end for receiving said vibrations, and a main transmission path for said vibrations through said medium which includes said corners as reflecting surfaces, at least one of said corners being exposed so that it may be ground off for precise delay adjustment.

10. A delay line comprising a substantially rectangular block of fused silica having beveled corners at one end, an input piezoelectric crystal and an output piezoelectric crystal secured to said block at the other end near the respective edges thereof, and an energy absorber secured directly to said other end between said crystals, said absorber being made of homogeneous material having an acoustical impedance differing from that of said block.

11. A delay line in accordance with claim 10 in which the acoustical impedance of said absorber is approximately 1.65 times the acoustical impedance of said block.

12. A delay line in accordance with claim 10 in which said absorber is made of solder.

13. A delay line in accordance with claim 10 in which one of said crystals is secured to said block by a bond comprising a plurality of layers of solder and at least one interposed layer of metal foil, said bond having a thickness approximately equal to a quarter wavelength at the resonant frequency of said one crystal.

14. A delay line in accordance with claim 10 in which one of said beveled corners is exposed so that it may be ground off for precise delay adjustment.

15. A delay line in accordance with claim 10 which includes a resistance and an inductance both connected in shunt with one of said crystals for flattening the transmission band.

16. A delay line in accordance with claim 15 in which said inductance has a reactance approximately equal in magnitude to the reactance of the interelectrode capacitance associated with said one crystal at its resonant frequency.

17. A delay line in accordance with claim 16 in which said resistor has a value approximately equal to 300 ohms.

HERBERT J. McSKIMIN.

References Cited in the file of this patent

UNITED STATES PATENTS

| Number | Name | Date |
|---|---|---|
| 2,263,902 | Percival | Nov. 25, 1941 |
| 2,416,337 | Mason | Feb. 25, 1947 |
| 2,430,013 | Hansell | Nov. 4, 1947 |
| 2,458,581 | Firestone | Jan. 11, 1949 |
| 2,505,515 | Arenberg | Apr. 25, 1950 |
| 2,532,546 | Forbes | Dec. 5, 1950 |